United States Patent [19]

Ryhänen

[11] Patent Number: 5,679,902
[45] Date of Patent: Oct. 21, 1997

[54] SURFACE-MICROMACHINED SYMMETRICAL DIFFERENTIAL PRESSURE SENSOR WITH ELECTRODES PATTERNED INTO MULTIPLE CONDUCTING AREAS

[75] Inventor: Tapani Ryhänen, Helsinki, Finland

[73] Assignee: Vaisala OY, Helsinki, Finland

[21] Appl. No.: 600,182

[22] Filed: Feb. 12, 1996

[30] Foreign Application Priority Data

Feb. 17, 1995 [FI] Finland .................... 950715

[51] Int. Cl.[6] .................... G01L 9/12
[52] U.S. Cl. .................... 73/718; 73/724; 361/283.3; 361/283.4
[58] Field of Search .................... 73/718, 724; 361/283.3, 361/283.4

[56] References Cited

U.S. PATENT DOCUMENTS 5,316,619  5/1994  Mastrangelo .................... 73/715 X

FOREIGN PATENT DOCUMENTS 4227819  2/1993  Germany.

*Primary Examiner*—Richard Chilcot
*Assistant Examiner*—Joseph L. Felber
*Attorney, Agent, or Firm*—Birch, Stewart, Kolasch & Birch, LLP

[57] ABSTRACT

The invention is related to a symmetrical capacitive differential pressure sensor formed by depositing onto a substrate (1) using the surface-micromachining methods of semiconductor device manufacturing technology. The sensor comprises the following, entirely from each other electrically insulated thin-film layers: an at least partially conducting sensing diaphragm (5) made from polysilicon and conducting counterelectrodes (3 and 7) adapted to both sides of the sensing diaphragm (5). According to the invention, said counter-electrodes (3 and 7) are made from polysilicon thin film and comprise at least one electrically conducting area.

19 Claims, 4 Drawing Sheets

SURFACE-MICROMACHINED SYMMETRICAL DIFFERENTIAL PRESSURE SENSOR WITH ELECTRODES PATTERNED INTO MULTIPLE CONDUCTING AREAS

BACKGROUND OF THE INVENTION

The invention is related to a surface-micromachined symmetrical differential pressure sensor.

Two major silicon micromechanical manufacturing techniques comprise bulk micromachining utilized for fabricating mechanical structures in monocrystalline silicon by etching and surface-micromachining in which mechanical structures are made on a silicon wafer by depositing a plurality of polysilicon thin films. Conventional differential pressure sensors with metallic diaphragms have been constructed symmetrically by locating the stationary counter-electrodes to both sides of the pressure-sensing diaphragm.

In all conventional symmetrical pressure sensor embodiments, the symmetrical sensor design is implemented so that the electrode diaphragms located to both sides of the flexible sensing diaphragm are designed to form a part of the massive, nonyielding sensor body.

Such prior-art techniques are handicapped, among other things, by long measurement delays due to the long, narrow pressure ports of the massive body structure. Furthermore, such narrow pressure ports are prone to contamination. Other shortcomings of the prior art are related to temperature drift errors.

SUMMARY OF THE INVENTION

It is an object of the present invention to overcome the drawbacks of the above-described techniques and to achieve an entirely novel type of surface-micromachined symmetrical differential pressure sensor.

The goal of the invention is achieved by constructing the sensor from three, at least partially conducting, thin-film diaphragms made from polysilicon so that the dielectric in the space between the diaphragms typically is air thus facilitating mutual movement between the diaphragms, whereby the outer diaphragms are perforated with a pattern of openings that make the diaphragms permeable to gaseous and liquid media. The center diaphragm is contiguous making it impermeable to gaseous media, whereby the diaphragm can deflect to either side under the gas pressures imposed on the sides thereof. When required, electrical potential differences applied between the perforated diaphragms and the contiguous diaphragm can be employed for controlling the position and movement of the diaphragms. Ideally, the perforated diaphragms are made substantially stiffer than the contiguous center diaphragm. This condition can be affected firstly to some extent by varying the thickness ratios of the diaphragms, and secondly, even more significantly, through controlling the tension of the diaphragms. In the feedback-controlled operating mode, the capacitance difference between the center diaphragm and the outer diaphragms of the sensor is advantageously kept constant, whereby the position of the pressure-sensing diaphragm relative to the perforated diaphragms in the sensor remains essentially constant, that is, the center diaphragm stays essentially unflexed between the two outer diaphragms. The two separate sensing capacitors of the sensor form a capacitive bridge that offers a number of different sensing capacitor transfer functions such as $(C_1-C_2)/(C_1+C_2)$.

More specifically, the sensor structure according to the invention is characterized in that the counter electrodes are made from polysilicon thin-film and comprise at least one electrically conducting area.

The invention offers significant benefits.

The symmetrical structure gives several benefits particularly with regard to a single-sided, asymmetrical structure:

The sensor structure has at least two sensing capacitances, whose difference can be easily detected by the measurement system electronics without the need for an external reference capacitor.

The position of the pressure-sensing diaphragm can be controlled to either direction with the help of electrical potential differences of feedback voltages applied between the sensing diaphragm and the perforated stationary diaphragms (such feedback arrangement makes it possible to keep the position of the sensing diaphragm essentially unchanged between the perforated stationary diaphragms). Moreover, the symmetrical structure facilitates linearization of the sensor transfer function between the differential pressure input variable and the sensor output signal when using a steplessly controllable feedback voltage.

The symmetrical structure is advantageous in terms of reduced temperature dependence.

Further benefits achievable over a conventional symmetrical sensor structure are listed as:

The perforated stationary diaphragms act as filters for particulate contamination by preventing the access of the dirt particles into the capacitor spacing.

The structure can be manufactured in a cost-effective manner and etching of the sacrificial silicon dioxide layers takes place rapidly via the openings of the silicon diaphragms.

Owing to the high density of the perforating openings, the sensor provides a quick response.

In an oil-filled sensor the response time can be adjusted by altering the size of the perforating openings.

The perforated diaphragms act as transient overpressure protection for the pressure-sensing diaphragm.

BRIEF DESCRIPTION OF THE DRAWINGS

In the following, the invention will be examined in more detail by means of exemplifying embodiments with reference to the attached drawings, in which.

DETAILED DESCRIPTION OF THE INVENTION

Figure 1:
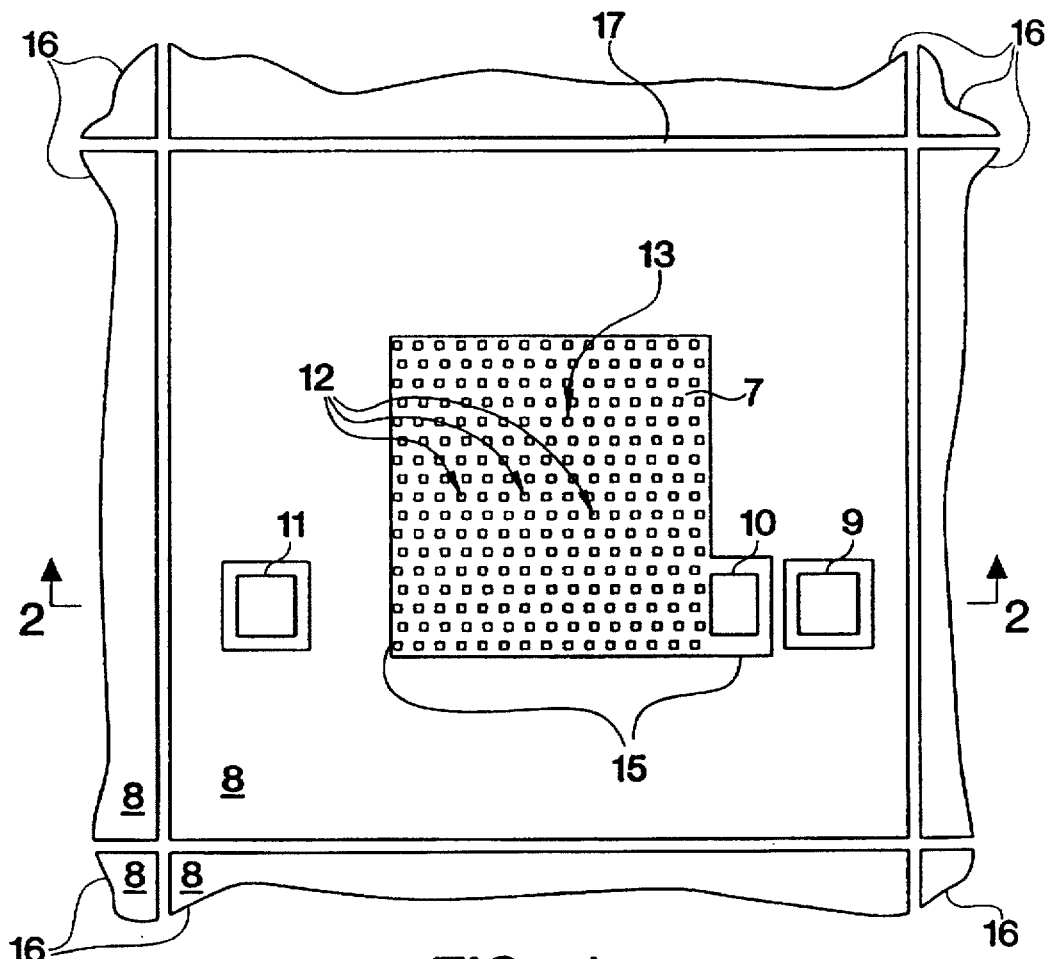
FIG. 1 is a lateral layout of an embodiment of the sensor structure according to the invention.

Referring to FIG. 1, the sensor elements shown therein are fabricated on a silicon wafer by means of surface-micromachining methods used in the semiconductor device manufacturing technology. The sensor chips 16 are separated from each other along sawn grooves 17 typically 150 μm wide. In the illustrated embodiment the perforating openings 12 of the top electrode 7 are etched into squares. The top electrode 7 thus provided with the perforating pattern can also perform as one pressure port 13 of the sensor. The dielectric layer 8 protects the sensor structure during the initial steps of the sensor manufacturing process. Metallic contact areas 9, 10 and 11 provide the measurement signals and/or are used for applying a signal thereto for controlling the electrodes in a desired manner.

Figure 2:
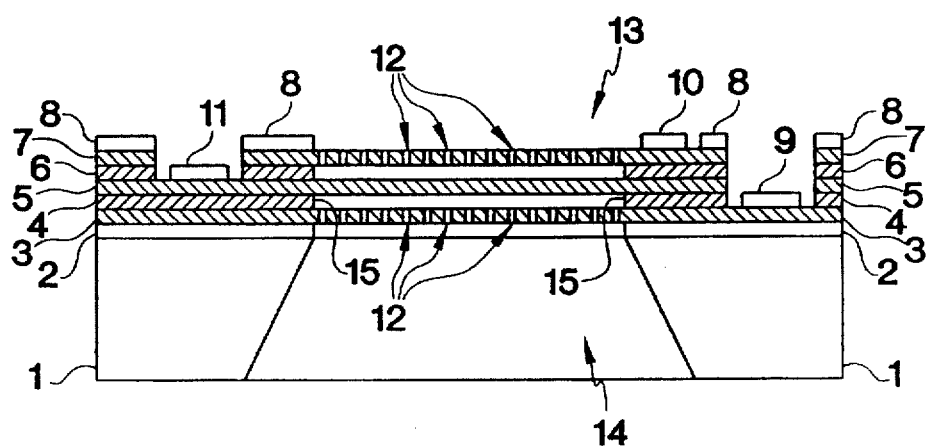
FIG. 2 is section 2—2 of the sensor structure shown in FIG. 1.

Referring to FIG. 2, the sensor structure shown therein is fabricated onto a monocrystalline silicon wafer 1 on which is further deposited a dielectric layer 2 that during the later fabrication steps serves to protect the structures to be deposited thereon. Next onto this structure is grown a perforated bottom electrode 3 from polysilicon. The pattern of perforating openings 12 is formed using either the lift-off method, or alternatively, applying a photoresist for subsequent etching of the openings 12 later in the layer 3. After this is deposited the first sacrificial silicon dioxide thin-film layer 4, followed by the deposition of the center electrode structure 5 from polysilicon. In the case the center electrode layer 5 is desired to be planar, the underlying thin film 4 must be made planar, because otherwise the pattern of perforating openings 12 made to the bottom electrode 3 will impose corresponding indents in the thin-film layer 4. However, such planarization is not a crucial step for the function of the sensor. Onto the electrode layer 5 is grown a second sacrificial silicon dioxide thin-film layer 6, and finally thereon, the top electrode 7 from polysilicon, after which the latter structure is perforated with openings in the same manner as the bottom electrode 3. The lateral dimension of the openings 12 is typically 1–100 μm, most typically 1–10 μm. Instead of having a square shape, the openings 12 may be fabricated circular, for instance. Onto the entire structure is deposited a dielectric layer 8 serving to protect the sensor structure during the etching of the lower pressure port 14. The effective width of the sensing diaphragm is herein defined as the dimension denoted in the diagram by reference numeral 15, whereby said dimension is in practice determined by the top width of the pressure port 14 and the width of the pattern of perforating openings 12. The well at the right-side edge and the corresponding well at the left-side edge for the contact areas 9 and 11 are made by either excluding these areas from the deposition processes of the superimposed layers by masking, or alternatively, etching-away material at these areas after such deposition steps. The metallizations 9, 10 and 11 are formed in the very last steps of the sensor manufacturing process. Typically, the center electrode 5 is 0.5–1 μm thick, while the stationary top/bottom electrodes 3 and 7 are 1–2 μm thick. Accordingly, the thickness of the stationary outer electrodes 3 and 7 is typically 1–4 times that of the center electrode 5.

More specifically, the sensor structure is fabricated by taking the following steps:

1) As required by the sensor structure, onto a silicon wafer 1 are grown and patterned polysilicon thin-film layers 3, 5 and 7, dielectric thin-film layers 2 and 8, as well as sacrificial silicon dioxide layers 4 and 6 which are etched away later in the process. In the process the polysisicon thin film layers 3, 5 and 7 are doped to be conductive and to have a desired internal stress by ion implantation of, for example, phosphorous, arsenic or boron. In the multilayer structure, the lowermost layer 2 and the topmost layer 8 made of silicon nitride, for instance, serve to protect the thin films against silicon etchants such as KOH or TMAH.

2) Into said monocrystalline silicon wafer 1 is etched a port opening 14 whose size after the etch-through step of the wafer is approximately equal to the width of the pressure-sensing diaphragm, that is, equal to the above-defined effective length 15. The opening 14 acting as the pressure port has a square shape. Such a shape results from anisotropic etching along the major axes of the crystalline structure of silicon.

3) Using plasma etching, for instance, the openings of the perforating pattern are etched-through in the dielectric layer 8 on the top surface of the sensor structure and in the dielectric layer 2 facing the inside of the port opening 14 made to the monocrystalline silicon. After this step, the center polysilicon thin-film diaphragm remains enclosed from both sides by only the perforated polysilicon thin-film diaphragms 3 and 7.

4) The sacrificial silicon dioxide layers 4 and 6 are etched away from between the perforated areas of the polysilicon thin-film layers 3 and 7 via the openings 12 made in said polysilicon thin-film layers 3 and 7.

5) The ready-made structure is dried using, for instance, sublimating t-butanol that prevents the diaphragms 3, 5 and 7 from adhering to each other.

During the deposition of the layers, possibly one planarization step must be carried out on the silicon dioxide layer 4 which is deposited onto the first perforated polysilicon thin-film layer 3. Otherwise, the perforated layer will print through as a wavy pattern in the super-imposed contiguous polysilicon layer as well as all other superimposed layers. However, this step is not mandatory in the process.

Advantageously, the diaphragms 3 and 7 acting as the stationary electrodes are produced so as to remain under a tension stress higher than that of the sensing diaphragm 5. Such a tension can be attained by suitable thermal treatment and doping.

Figure 3:
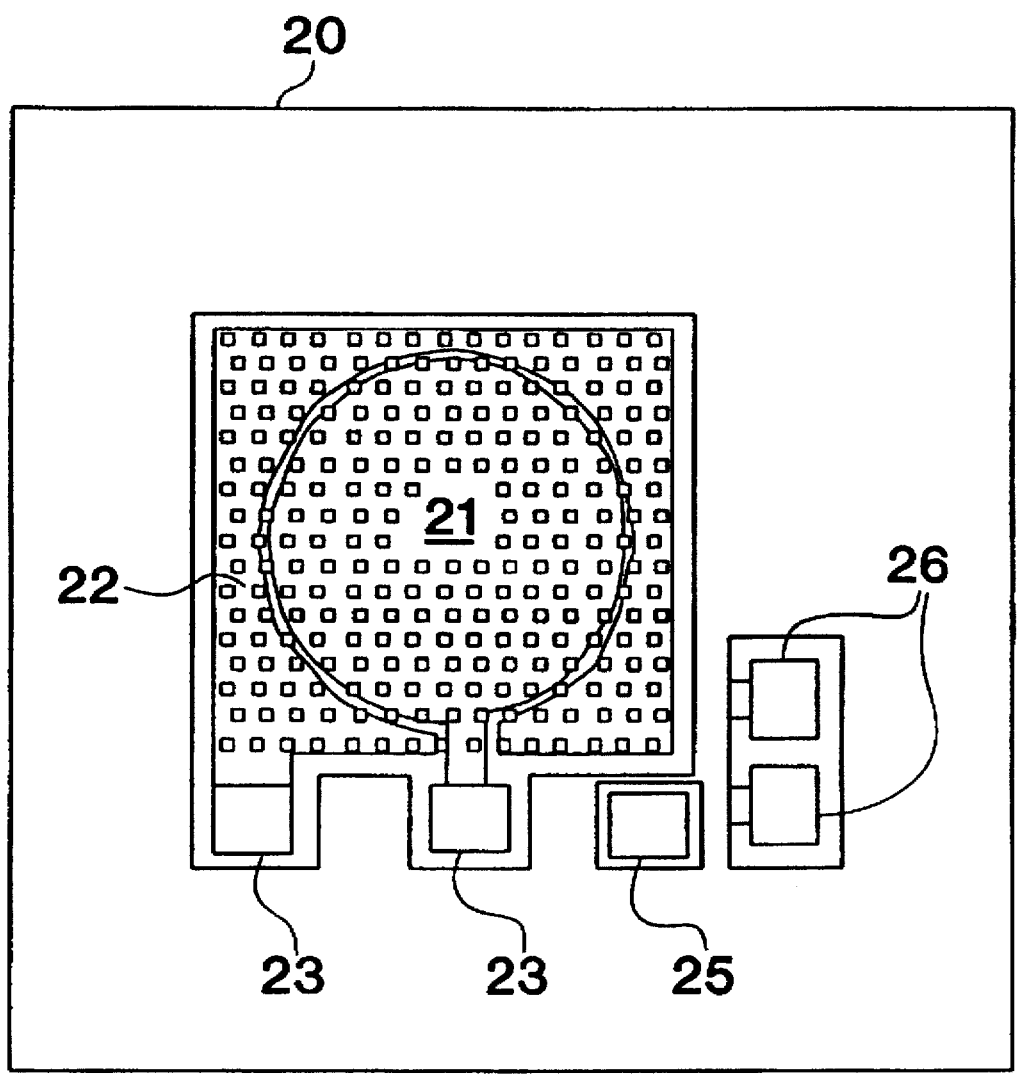
FIG. 3 is a lateral layout of an alternative embodiment of the sensor structure according to the invention.

Referring to FIG. 3, the outer electrodes of the sensor structure 20 can be divided into two parts by first patterning the top electrode structure made from a dielectric material into two areas 21 and 22 which are isolated from each other and driven by separate signals via contact areas 23. The bottom electrode structure is patterned in a similar fashion for driving with signals applied to contact areas 26. The patterning method can be, e.g., ion implantation of for example phosphorous, arsenic or boron. The electrical signal connection for the center electrode is provided by contact area 25. In a preferred embodiment the conducting electrodes 21 and 23 have at least approximately equal areas.

Figure 4:
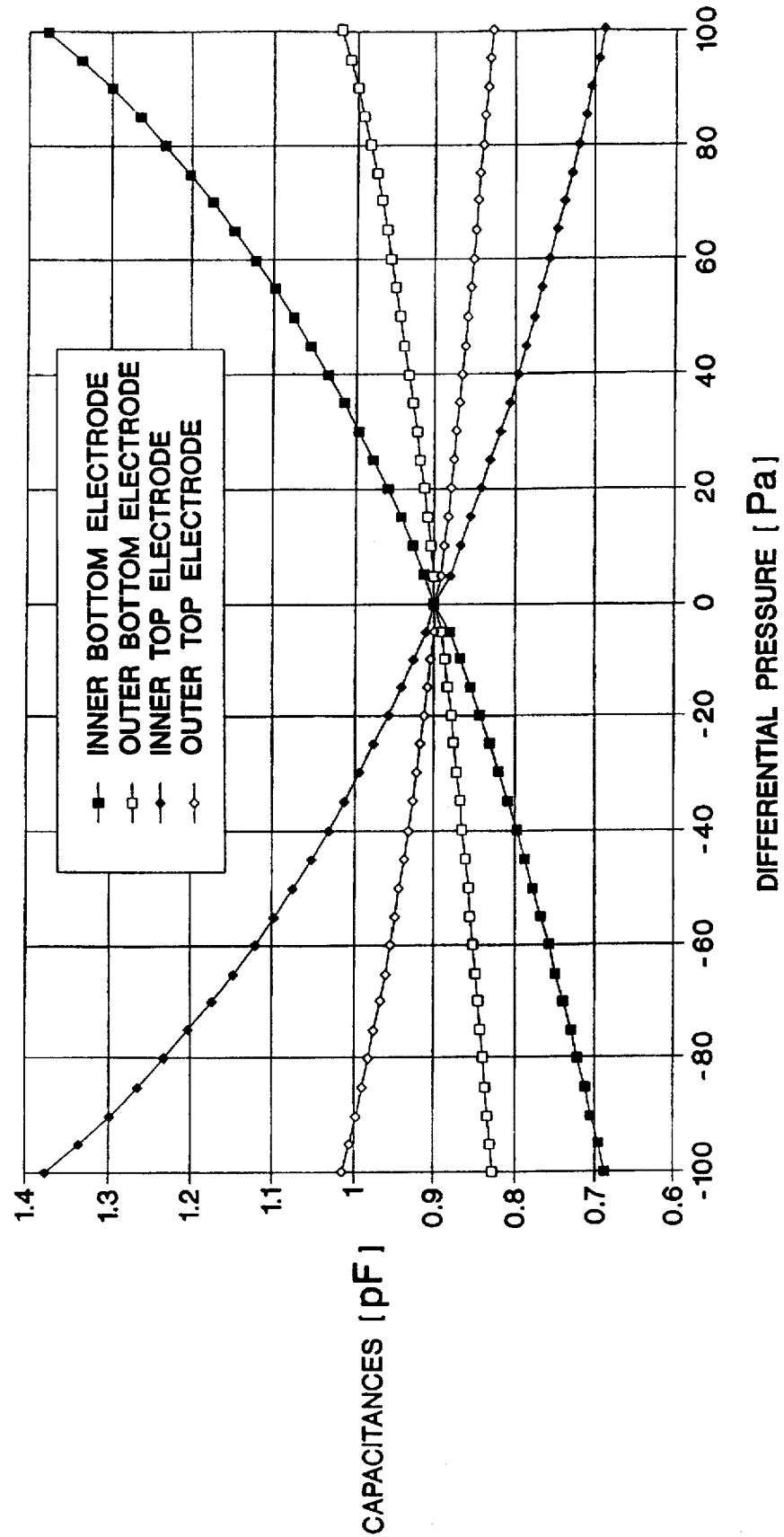
FIG. 4 is a graph plotting the capacitances of the structure shown in FIG. 3 as a function of pressure.

Referring to FIG. 4, the curves plotted therein illustrate graphically the capacitances of the four electrodes against the center electrode (sensing diaphragm) in the sensor embodiment shown in FIG. 3. In the case depicted in the diagram, the sensor behaves ideally symmetrically. The side of the pressure-sensing diaphragm is 0.5 mm long, the depth of the capacitor chamber (that is, distance between the diaphragms) is 1 μm and the thickness of the pressure-sensing diaphragm is 1 μm. Further, the pressure-sensing diaphragm is made free from tension stress. Both top electrodes 21 and 22 as well as the bottom electrodes have equal areas. As is evident from the diagram, the capacitances from all these electrodes to the pressure-sensing electrode are equal at zero differential pressure, whereby the capacitive bridge is balanced.

Figure 5:
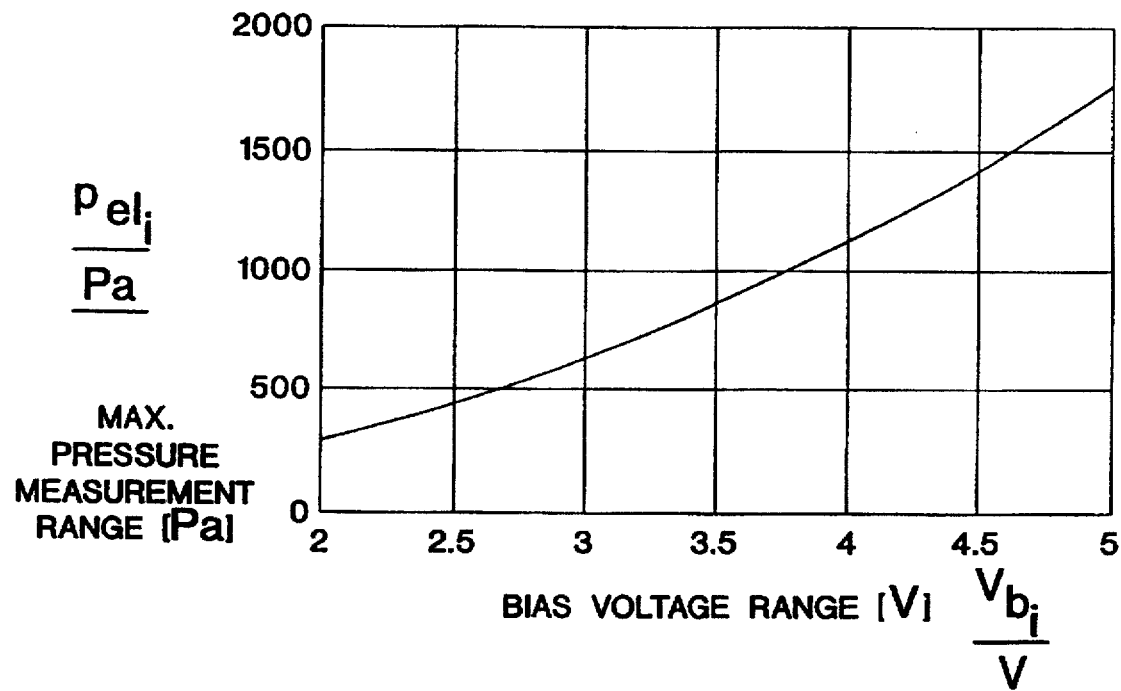
FIG. 5 is a graph plotting the maximum measurement range vs. sensor bias voltage for 2 μm deep sensing capacitor chambers.
Figure 6:
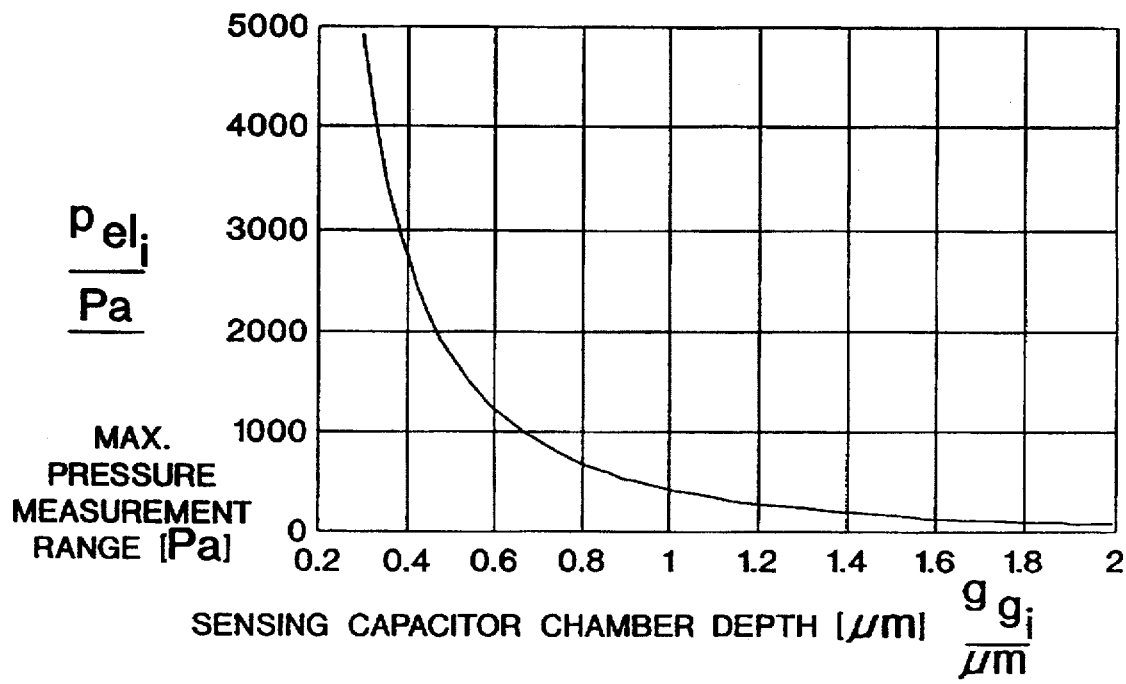
FIG. 6 is a graph plotting the maximum measurement range vs. depth of sensing capacitor chambers for a bias voltage range of ±5 V.

The thicknesses of the sacrificial silicon dioxide layers 4 and 6 must be as small as possible in order to reach sufficiently high electrostatic forces by virtue of the electrical potential differences applied between the diaphragms. Typically, these layers are made approx. 0.5 μm thick. Then, a bias voltage range of ±5 V applied to both sides of the pressure-sensing diaphragm is sufficient to provide a pressure measurement range of approx. ±1800 Pa. The dependence of the maximum measurement range on the bias voltage is illustrated in FIG. 5, while the corresponding dependence of the measurement range on the depth of the sensing capacitor chamber is shown in FIG. 6. Herein, the depth of the capacitor chamber must be understood as referring to distance between the electrode structures 3 and 5 as well as 5 and 7, respectively.

The sensor is designed for an ideal side length, equivalent to the dimension denoted by reference numeral 15, of approx. 0.5 mm for the sensing diaphragm. Then, the maximum width of the etching-through hole is approx. 1.2 mm in 0.5 mm thick silicon wafers. With provisions for the sawing grooves 17 and a sufficiently strong supporting structure of the sensor, the total footprint of the sensor is approx. 2×2 mm$^2$. Approx. 1400 pcs. of such sensor chips can be fitted on a single 4-in. wafer.

Naturally, some minor disadvantages are associated with the present sensor structure such as:

The size of the sensor will be somewhat larger than in conventional structures as the opening for the sensing capacitor made through the silicon wafer requires a larger silicon area.

The outer diaphragms are not ideally stiff. Therefore, under the electrically applied feedback forces the outer diaphragms can yield to some extent. This causes nonlinearity error in the transfer function of the feedback-connected control electronics.

I claim:

1. A symmetrical differential pressure sensor, which comprises:

a substrate;

an at least partially conducting sensing diaphragm made from a polysilicon thin film provided on said substrate;

a conducting lower counterelectrode, made from a polysilicon thin film and having at least one conducting area, provided between said substrate and said diaphragm and being spaced apart and electrically insulated from said diaphragm; and a conducting upper counterelectrode, made from a polysilicon thin film and having at least one conducting area, provided on a side of said diaphragm opposite to said lower counterelectrode and being spaced apart and electrically insulated from said diaphragm;

wherein at least one of the upper and lower electrodes is divided by patterning into at least two conducting areas, which are electrically isolated from each other.

2. The sensor as defined in claim 1, wherein said upper and lower counterelectrodes are supported on the substrate at the electrode edges only.

3. The sensor as defined in claim 2, wherein said upper and lower counterelectrodes are maximally 5 times thicker than said diaphragm (5).

4. The sensor as defined in claim 2, wherein said upper and lower counterelectrodes are under a higher tension stress than said diaphragm.

5. The sensor as defined in claim 2, wherein said upper and lower counterelectrodes are provided with a pattern of perforating openings.

6. The sensor as defined in claim 5, wherein the openings of said perforating pattern are square in shape.

7. The sensor as defined in claim 5, wherein the openings of said perforating pattern are circular in shape.

8. The sensor as defined in claim 5, wherein the lateral dimension of said openings of said perforating pattern is 1–100 µm.

9. The sensor as defined in claim 8, wherein the lateral dimension of said openings of said perforating pattern is in the range of from about 1 to 10 µm.

10. The sensor as defined in claim 1, wherein said upper and lower counterelectrodes are provided with a pattern of perforating openings.

11. The sensor as defined in claim 10, wherein the openings of said perforating pattern are square in shape.

12. The sensor as defined in claim 10, wherein the openings of said perforating pattern are circular in shape.

13. The sensor as defined in claim 10, wherein the lateral dimension of said openings of said perforating pattern is 1–100 µm.

14. The sensor as defined in claim 13, wherein said lateral dimension of said openings is in the range of from about 1 to 10 µm.

15. The sensor as defined in claim 1, wherein said upper and lower counterelectrodes are maximally 5 times thicker than said diaphragm.

16. The sensor as defined in claim 1, wherein said counterelectrodes are under a higher tension stress than said diaphragm.

17. The sensor as defined in claim 1, wherein said substrate is silicon.

18. The sensor as defined in claim 1, wherein said conducting areas are patterned using different amount of doping of polysilicon.

19. The sensor as defined in claim 18, wherein said conducting areas are patterned by ion implantation through a photoresist mask.

* * * * *